(12) United States Patent
Swoboda (10) Patent No.: US 9,325,426 B2
(45) Date of Patent: Apr. 26, 2016

(54) BURST-MODE RECEIVER HAVING A WIDE DYNAMIC RANGE AND LOW PULSE-WIDTH DISTORTION AND A METHOD

(71) Applicant: Avago Technologies General IP (Singapore) Pte. Ltd., Singapore (SG)

(72) Inventor: Robert Swoboda, Vienna (AT)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 77 days.

(21) Appl. No.: 14/013,565

(22) Filed: Aug. 29, 2013

(65) Prior Publication Data

US 2015/0016828 A1    Jan. 15, 2015

Related U.S. Application Data

(60) Provisional application No. 61/845,365, filed on Jul. 11, 2013.

(51) Int. Cl.
 *H04B 10/69* (2013.01)

(52) U.S. Cl.
 CPC .......... *H04B 10/6931* (2013.01); *H04B 10/695* (2013.01)

(58) Field of Classification Search
 CPC .......................... H04B 10/695; H04B 10/6931
 See application file for complete search history.

(56) References Cited

U.S. PATENT DOCUMENTS

| 6,911,644 | B2 | 6/2005 | Doh et al. |
| 8,284,872 | B2 | 10/2012 | Sugawa et al. |
| 8,537,941 | B1 * | 9/2013 | French et al. ................. 375/345 |
| 2006/0216042 | A1 * | 9/2006 | Yeo et al. ...................... 398/209 |
| 2007/0098416 | A1 * | 5/2007 | Nogami et al. ............... 398/208 |

OTHER PUBLICATIONS

Jasmien Put, Xin Yin, Xing-Zhi Qiu, Jan Gillis, Jochen Verbrugghe, Johan Bauwelinck, Jan Vandewege, Fabrice Blache, Delphine Lanteri, Mohand Achouche, Heinz-Georg Krimmel, Dora Van Veen, Peter Vetter, DC-Coupled Burst-Mode Receiver With High Sensitivity, Wide Dynamic Range and Short Settling Time for Symmetric 10G-GPONs, Optics Express, Dec. 12, 2011, pp. 594-603, vol. 19 No. 26, Optical Society of America, United States.
Ki-Hyuk Lee, Woo-Young Choi, 1.25Gbps Burst-Mode Receiver Front-End for PON, Department of Electrical and Electronic Engineering, Apr. 2005, pp. 1-4, Yonsei University, Republic of Korea.

(Continued)

*Primary Examiner* — Shi K Li
*Assistant Examiner* — Mina Shalaby (57) ABSTRACT

A burst-mode Rx is provided that has a wide dynamic range, low pulse-width distortion and low technological overhead. The Rx is capable of processing signals having levels that range from low noise levels up to high noise levels. In addition, the Rx is capable of quickly and simultaneously adapting the TIA gain and the bit decision threshold level, thereby eliminating the need to transmit and receive a training bit sequence prior to transmitting and receiving actual data. By simultaneously adapting the TIA gain and the bit decision threshold level on the first bit of actual data received in the Rx, the Rx is capable of being used with short packets and with packets of varying lengths transmitted from different types of transmitters located in the same network.

11 Claims, 4 Drawing Sheets

(56) References Cited

OTHER PUBLICATIONS

Eduard Sackinger, Broadband Circuits for Optical Fiber Communication, Lecture Notes, Mar. 2002, pp. 1-224, Agere Systems, Holmdel, United States.

Chao Su, Lian-Kuan Chen, Kwok-Wai Cheung, Theory of Burst-Mode Receiver and Its Applications in Optical Multiaccess Networks, Journal of Lightwave Technology, Apr. 1997, pp. 590-606, vol. 15. No. 4, IEEE, United States.

* cited by examiner

BURST-MODE RECEIVER HAVING A WIDE DYNAMIC RANGE AND LOW PULSE-WIDTH DISTORTION AND A METHOD

CROSS-REFERENCE TO RELATED APPLICATIONS

This application claims priority to U.S. provisional patent application No. 61/845,365, which is incorporated herein by reference in its entirety.

TECHNICAL FIELD OF THE INVENTION

The invention relates to receivers. More particularly, the invention relates to a burst-mode receiver.

BACKGROUND OF THE INVENTION

A typical optical receiver (Rx) includes at least one photodiode that detects an optical signal and converts it into an electrical signal and at least one transimpedance amplifier (TIA) that converts the electrical signal into a voltage signal. The photodetector, which is typically a P-intrinsic-N (PIN) photodiode, produces an electrical current signal in response to light detected by the photodetector. The TIA converts this electrical current signal into an output voltage signal having some gain, commonly referred to as transimpedance gain. This output voltage signal is further processed by other stages (i.e., a limiting amplifier (LA), clock and data recover (CDR), etc.) of the Rx.

The TIA handles input signals (the photodiode output) of varying optical modulation amplitude (OMA) and average power ($P_{avg}$), and therefore needs to have a wide input dynamic range. Wide input dynamic range is typically achieved by incorporating an automatic gain control (AGC) circuit in the RX portion for automatically adjusting the gain of the TIA based on the amplitude of the input signal. If the Rx does not include an AGC circuit, the TIA of the Rx will try to use its transimpedance gain to convert the current into a corresponding output voltage as the amplitude of input current signal increases. When this happens, however, the transimpedance gain is limited by the voltage headroom (the maximum high and low output voltage for linear operation of the TIA) as the output voltage swing increases, which results in the output signal becoming distorted. Hence, an AGC circuit is needed in order to lower the gain of the TIA as the amplitude of the input signal grows so as to prevent the TIA from saturating and producing distortion at its output.

Burst-mode optical Rxs are used in networks in which optical signals of various optical power levels and phases (timeslots) are transmitted from various sources. The TIA used in a burst-mode optical Rx should be capable of handling such optical signals. Although it is known to use AGC circuits in burst-mode optical Rxs for automatically adjusting the gain of the TIA based on the incoming signal, existing solutions generally have large pulse-width distortions and limited dynamic range, especially for the first bit received after a long period of quiescence.

Moreover, existing solutions typically require transmission of a training bit sequence to the Rx prior to the data being transmitted. The training bit sequence is then processed in the Rx to set the TIA gain and the decision threshold value. Use of the training bit sequence increases processing overhead and reduces the effective data rate of the optical link.

Accordingly, a need exists for a burst-mode Rx that is capable of adapting both the gain and the decision threshold simultaneously and very quickly to obviate the need to transmit and receive a training bit sequence.

SUMMARY OF THE INVENTION

The invention is directed to a burst-mode Rx and methods for use in a burst-mode Rx. The burst-mode Rx has a wide dynamic range and low pulse-width distortion. In accordance with an illustrative embodiment, the Rx is configured to adapt a gain of a TIA circuit of the Rx and to adapt a decision threshold voltage of a bit decision circuit of the Rx substantially simultaneously based on a first bit of data of a data transmission received in the Rx, thereby obviating a need to transmit a training bit sequence to the Rx prior to transmitting the data transmission to the Rx.

In accordance with an illustrative embodiment, the burst-mode Rx comprises a detector, a TIA circuit, an AGC circuit, a threshold generation circuit, a bit decision circuit, and a timing adjustment circuit. The detector is configured to receive an input signal and to output an electrical detection signal. The TIA circuit receives the electrical detection signal output by the optical detector. The TIA circuit comprises at least a first variable resistor having a resistance value that can be varied to cause a gain of the TIA circuit to be varied. The TIA circuit outputs an output voltage signal, $V_{OUT}$, having a value that is based at least in part on the gain of the TIA circuit. The AGC circuit receives $V_{OUT}$. The AGC circuit has a controller circuit that causes an AGC output voltage signal, $V_{AGC}$, having a value that is set based at least in part on $V_{OUT}$ to be output from the AGC circuit to the TIA circuit. The resistance value of the variable resistor is varied based on the value of $V_{AGC}$. The threshold generation circuit receives $V_{OUT}$ and produces a bit decision threshold value, $V_{THDEC}$, based on $V_{OUT}$. $V_{THDEC}$ is output from the threshold generation circuit. The threshold generation circuit varies $V_{THDEC}$ based on variations of $V_{OUT}$. The bit decision circuit receives $V_{OUT}$ from the TIA circuit, receives $V_{THDEC}$ from the threshold generation circuit, compares $V_{OUT}$ to $V_{THDEC}$, produces a bit decision signal that is based on the comparison of $V_{OUT}$ to $V_{THDEC}$, and outputs the bit decision signal from the bit decision circuit. The timing adjustment circuit receives the bit decision signal from the bit decision circuit, adjusts a pulse width of the bit decision signal to reduce or eliminate pulse-width distortion in the bit decision signal, and outputs a data output signal.

In accordance with another embodiment, the burst-mode Rx comprises a detector, a TIA circuit, a threshold generation circuit, a bit decision circuit, and a timing adjustment circuit. The detector is configured to receive an input signal and to output an electrical detection signal. The TIA circuit receives the electrical detection signal output by the detector. The TIA circuit comprises at least a first variable nonlinear resistor having a resistance value that varies over a range of resistance values to cause a gain of the TIA circuit to be varied. The TIA circuit outputs an output voltage signal, $V_{OUT}$, having a value that is based at least in part on the gain of the TIA circuit. The gain variations caused by the resistance value variations provide an AGC function for the TIA circuit that obviates the need for an AGC circuit. A threshold generator receives $V_{OUT}$ and produces a bit decision threshold value, $V_{THDEC}$, based on $V_{OUT}$. $V_{THDEC}$ is output from the threshold generator. The threshold generator varies $V_{THDEC}$ based on variations of $V_{OUT}$. The bit decision circuit receives $V_{OUT}$ from the TIA circuit, receives $V_{THDEC}$ from the threshold generator, compares $V_{OUT}$ to $V_{THDEC}$, produces a bit decision signal that is based on the comparison of $V_{OUT}$ to $V_{THDEC}$, and outputs the bit decision signal from the bit decision circuit. The timing adjustment circuit receives the bit decision signal from the bit decision circuit, adjusts a pulse width of the bit decision signal to reduce or eliminate pulse-width distortion in the bit decision signal, and outputs a data output signal.

In accordance with an illustrative embodiment, the method comprises:

receiving an input signal with a detector and outputting an electrical detection signal;

with a TIA circuit having a variable gain, receiving the electrical detection signals produced by the detector;

outputting an output voltage signal, $V_{OUT}$, from the TIA circuit, where $V_{OUT}$ has a value that is based at least in part on the gain of the TIA circuit;

with an AGC circuit, producing an AGC output voltage signal, $V_{AGC}$, having a value that is set based on $V_{OUT}$;

outputting $V_{AGC}$ from the AGC circuit to the TIA circuit;

in the TIA circuit, varying a resistance value of a variable resistor of the TIA circuit based on the value of $V_{AGC}$ to cause the gain of the TIA circuit to vary;

in a threshold generation circuit, producing a bit decision threshold value, $V_{THDEC}$, based on $V_{OUT}$, where the threshold generation circuit varies $V_{THDEC}$ based on variations of $V_{OUT}$;

in a bit decision circuit, comparing $V_{OUT}$ to $V_{THDEC}$ and producing a bit decision signal that is based on the comparison; and with a timing adjustment circuit, adjusting a pulse width of the bit decision signal to reduce or eliminate pulse-width distortion in the bit decision signal and outputting a data output signal.

In accordance with an illustrative embodiment, the method comprises:

with a detector, receive an input signal and outputting an electrical detection signal;

with a TIA circuit comprising at least a first variable nonlinear resistor having a resistance value that varies over a range of resistance values to cause a gain of the TIA circuit to be varied, receiving the electrical detection signal outputted by the detector, where the TIA circuit;

outputting an output voltage signal, $V_{OUT}$, from the TIA circuit, where $V_{OUT}$ has a value that is based at least in part on the gain of the TIA circuit, and where the gain variations that are caused by the resistance value variations provide an AGC function for the TIA circuit that obviates the need for an AGC circuit;

in a threshold generator, receiving $V_{OUT}$ and producing a bit decision threshold value, $V_{THDEC}$, based on $V_{OUT}$, where the threshold generator varies $V_{THDEC}$ based on variations of $V_{OUT}$;

outputting $V_{THDEC}$ from the threshold generator;

in a bit decision circuit, comparing $V_{OUT}$ to $V_{THDEC}$ and producing a bit decision signal that is based on the comparison of $V_{OUT}$ to $V_{THDEC}$; and with a timing adjustment circuit, adjusting a pulse width of the bit decision signal to reduce or eliminate pulse-width distortion in the bit decision signal and outputting a data output signal.

These and other features of the invention will become apparent from the following description, drawings and claims.

DETAILED DESCRIPTION OF AN
ILLUSTRATIVE EMBODIMENT

In accordance with embodiments of the invention, a burst-mode Rx is provided that has a wide dynamic range, low pulse-width distortion and low technological overhead. The Rx is capable of processing signals having levels that range from noise levels on the low end up to high signal levels (i.e., generally no noise) on the high end. In addition, the Rx is capable of quickly and simultaneously adapting the TIA gain and the bit decision threshold level, thereby eliminating the need to transmit and receive a training bit sequence prior to transmitting and receiving actual data. In accordance with illustrative embodiments described herein, the Rx is configured to simultaneously adapt the TIA gain and the bit decision threshold level on the first bit of actual data received in the Rx, which is not possible in the aforementioned known solutions. This feature also allows the Rx to be used with short packets and with packets of varying lengths transmitted from different types of transmitters located in the same network.

These features also make the burst-mode Rx an ideal solution for plastic optical fiber (POF) networks that employ passive optical star couplers. In such networks, the transmit power can be high due to the large overdrive capability of the back-to-back Rx configurations used in the networks. The wide dynamic range of the optical Rx makes it well suited for use in such networks. In addition, because the burst-mode optical Rx has very high sensitivity, it is well suited for use in networks that have very large numbers of ports, long fibers, or links that employ many connectors. The Rx, however, is not limited to being employed in such networks, as will be understood by those of skill in the art in view of the description being provided herein.

Embodiments of the invention combine known peak detection and fast gain setting techniques with techniques for post processing of the pulse width. Decision threshold and gain management circuits of the Rx ensure that the bit decision threshold value is maintained at an optimum level for the complete dynamic range of the Rx. Because the use of adaptive threshold techniques result in the detected bits being enlarged in time, a post-processing circuit of the Rx processes the pulse width after the bit decision is made in order to shorten the pulse width to thereby reduce or eliminate pulse width distortion over the entire dynamic range of the Rx. In accordance with illustrative embodiments, the dynamic range of the Rx ranges from the natural noise level on the low end of the range to several milliamperes (mA) of photocurrent on the high end of the range.

Figure 2:
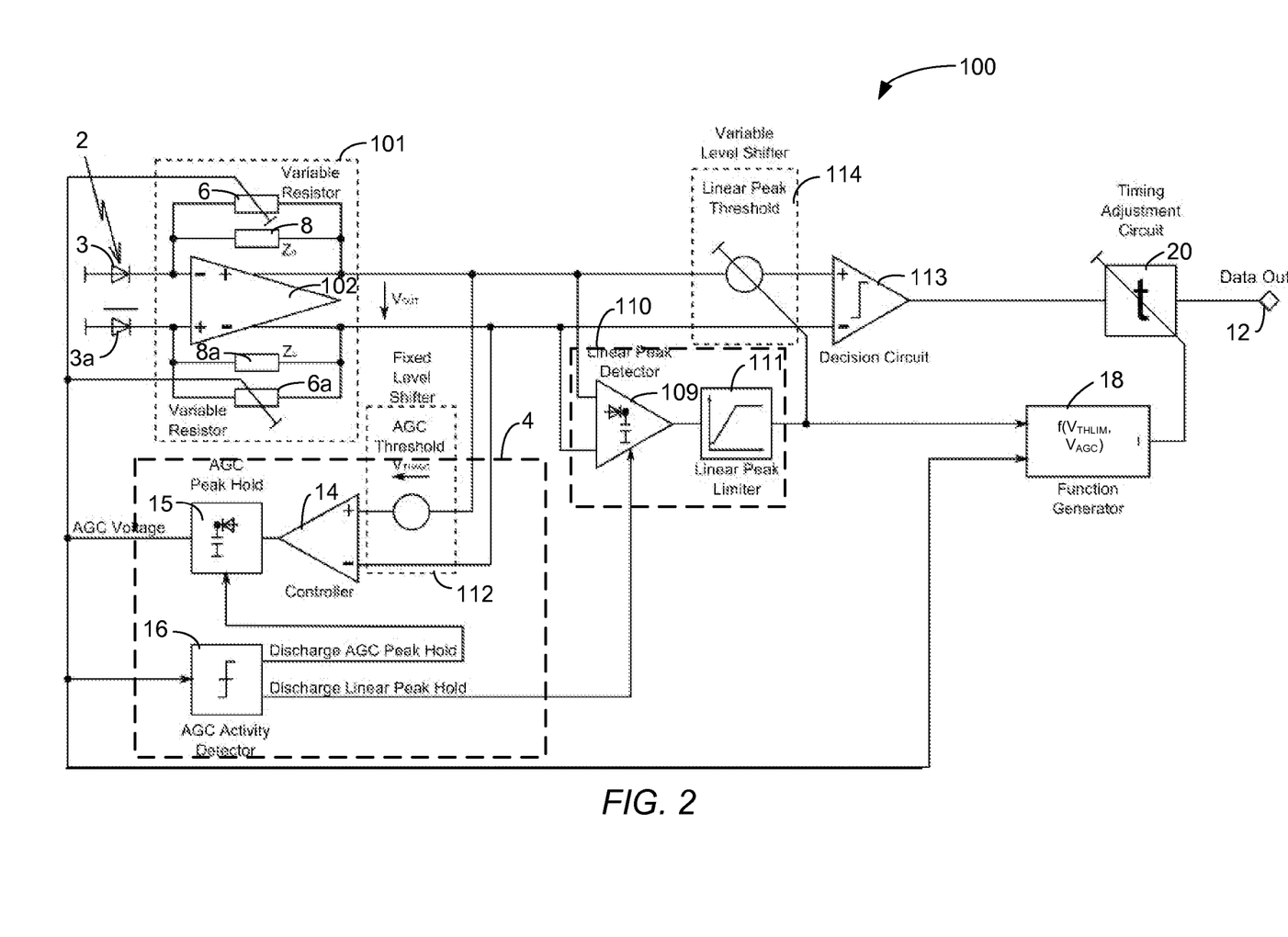
FIG. 2 is a schematic diagram of the burst-mode optical Rx in accordance with a second illustrative embodiment.
Figure 3:
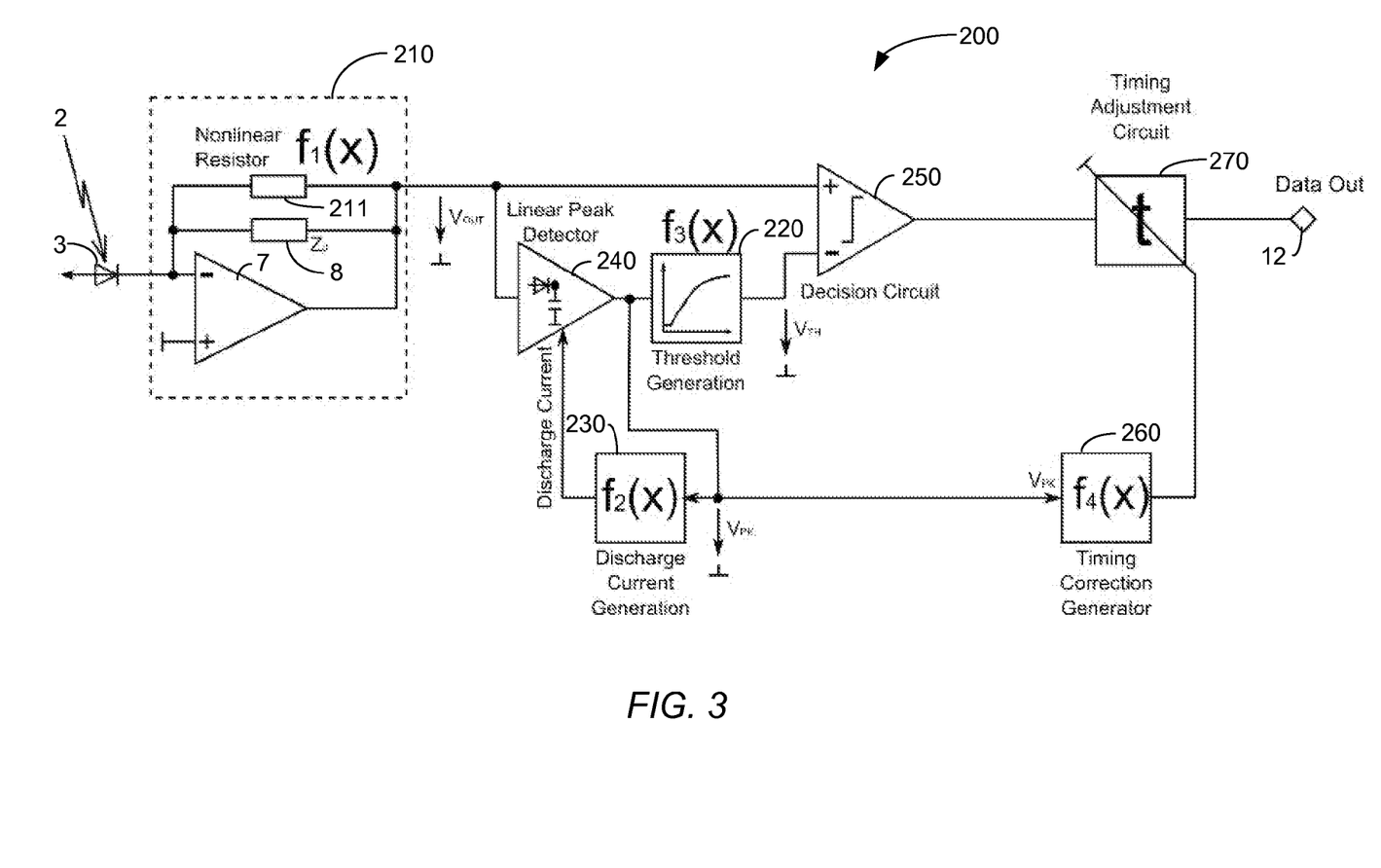
FIG. 3 is a schematic diagram of the burst-mode optical Rx in accordance with a third illustrative embodiment.
Figure 4:
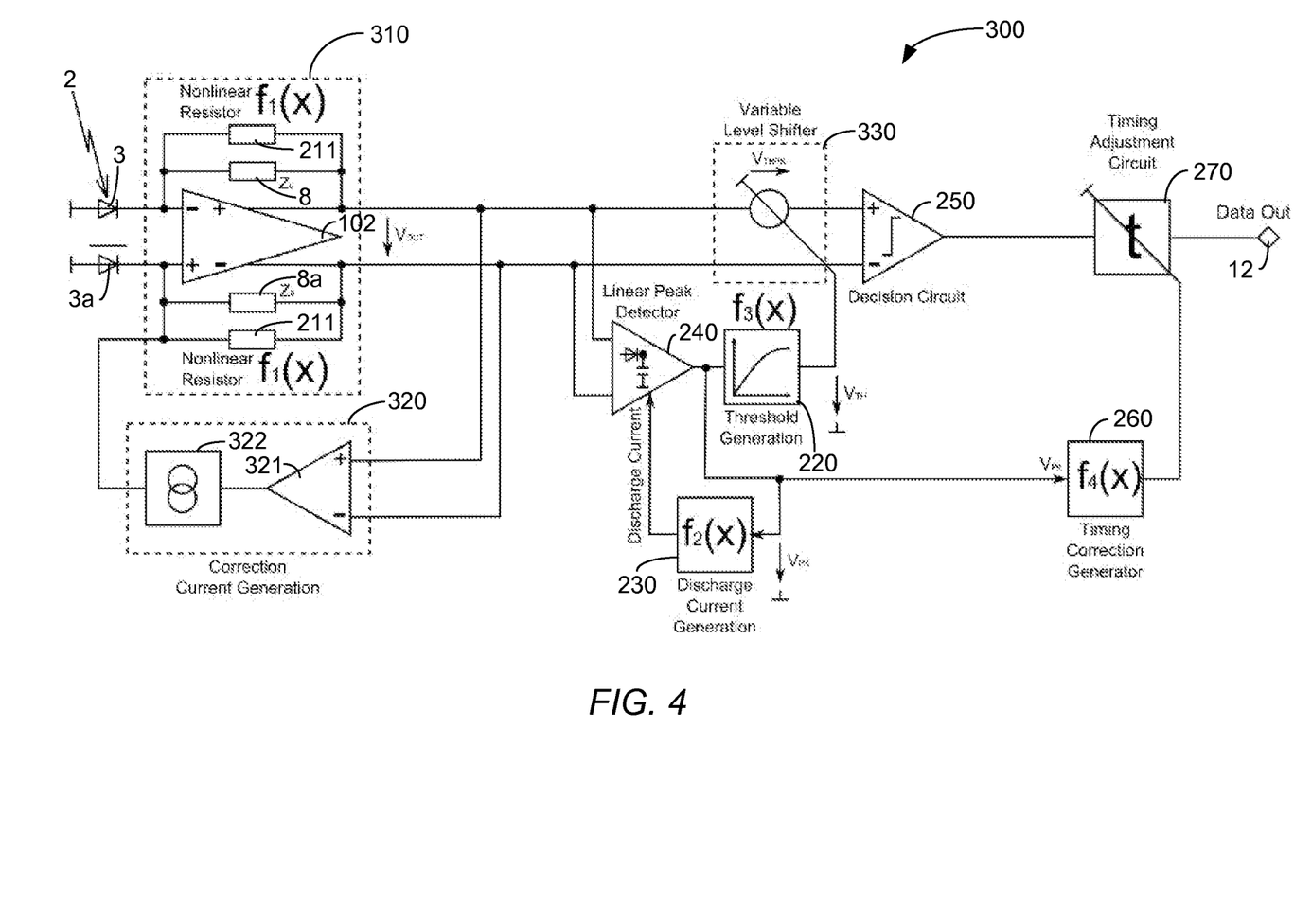
FIG. 4 is a schematic diagram of the burst-mode optical Rx in accordance with a fourth illustrative embodiment.

Due to the various approaches that can be taken for providing fast gain settling, two different illustrative topologies are presented herein, which are referred to herein as Topologies A (FIGS. 1 and 2) and B (FIGS. 3 and 4). In topology A, the feedback resistors of the TIA circuit are actively steered by an AGC circuit to keep the output voltage of the TIA circuit at a constant level for input currents above the AGC threshold level. In topology B, a nonlinear resistive element is provided in parallel with the conventional linear feedback resistor of the TIA circuit to reduce the gain of the TIA circuit for increasing photocurrents. In both topologies, these TIA gain adjustment features are used in combination with features for fast adaptation of the bit decision threshold level and post processing of the pulse width to achieve the aforementioned goals and advantages. The different topologies have different advantages that make them suitable for use in different types of network configurations or in networks that have different bandwidth ranges, as will be described below in more detail. Illustrative, or exemplary, embodiments will be described below with reference to FIGS. 1-4, in which like reference numerals represent like components, elements or features.

Figure 1:
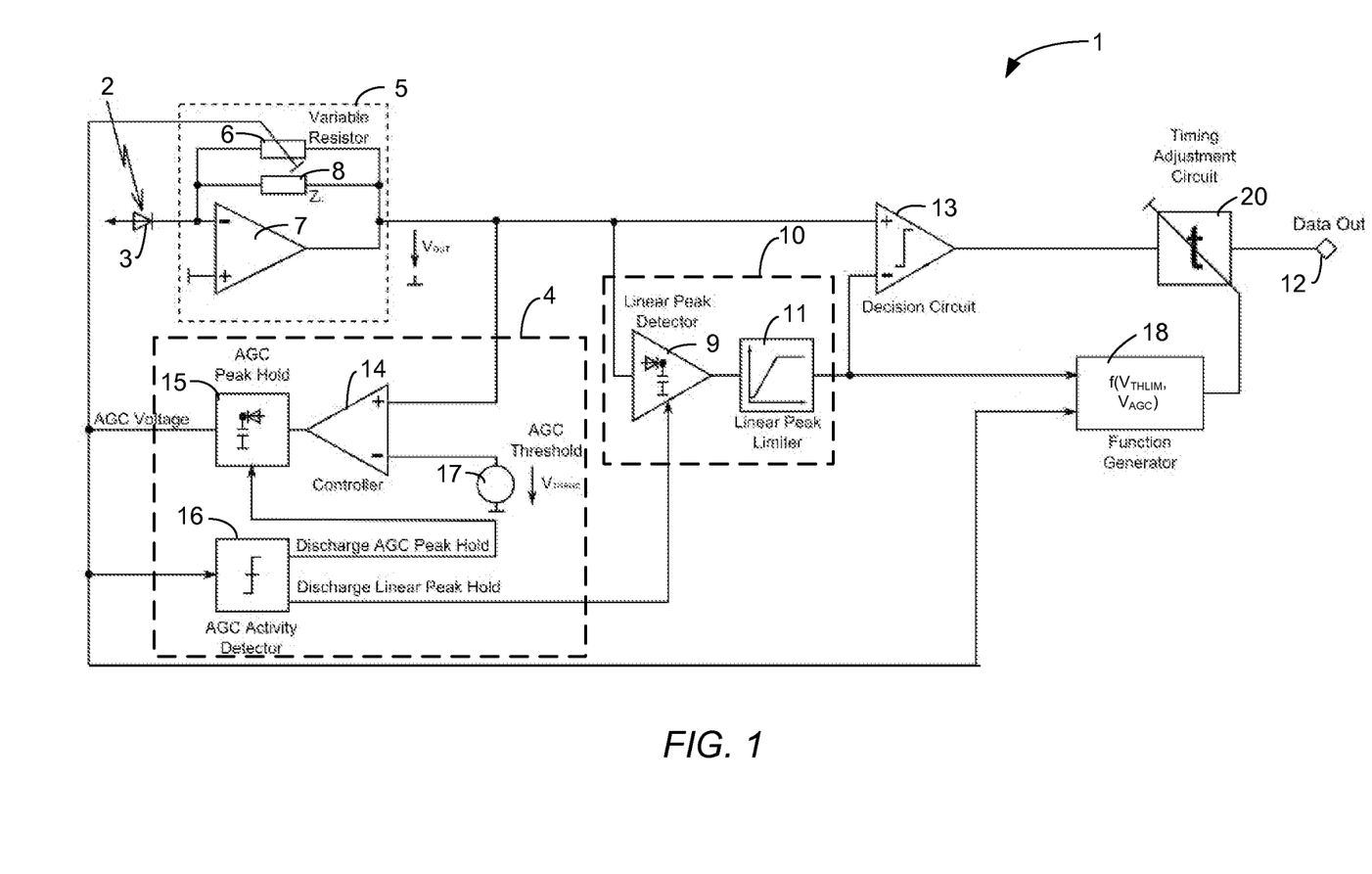
FIG. 1 is a schematic diagram of the burst-mode optical Rx in accordance with a first illustrative embodiment.

FIG. 1 is a schematic diagram of the burst-mode optical Rx 1 in accordance with a first illustrative embodiment in which a single-ended, Topology A configuration is employed. An optical input signal 2 stimulates an electrical current in a photodiode 3 of the optical Rx 1. For the case where the input signal 2 is small, an AGC circuit 4 of the optical Rx 1 is in an inactive state. When the AGC circuit 4 is in the inactive state, a TIA circuit 5 of the optical Rx 1 is operating with its highest gain, and a voltage-controllable or current-controllable variable resistor 6 of the TIA circuit 5 is in a high-impedance state. In accordance with Topology A, the resistance value of the voltage-controllable or current-controllable variable resistor 6 is steered by the AGC circuit 4. An amplifier 7 of the TIA circuit 5 has a fixed resistor 8 that has a fixed resistance value. The resistance values of the resistors 6 and 8 provide the TIA circuit 5 with a transimpedance value, $Z_0$, that linearly translates the electrical current signal produced by the photodiode 3 into an output voltage, $V_{OUT}$, which is output from the TIA circuit 5.

A linear peak detector 9 of the optical Rx 1 detects the maximum $V_{OUT}$ and generates a threshold voltage, $V_{TH}$, based on the maximum $V_{OUT}$. A linear peak limiter 11 of the optical Rx 1 limits $V_{TH}$ and outputs a limited threshold voltage $V_{THLIM}$. The linear peak detector 9 and the linear peak limiter 11 together comprise a threshold generation circuit 10. The minimum limit for $V_{THLIM}$ is $V_{THMIN}$ and the maximum limit for $V_{THLIM}$ is $V_{THMAX}$. The minimum limit $V_{THMIN}$ is typically set to a value that is greater than zero to prevent sporadic toggling of the data output signal 12 when there is no optical input signal 2. A threshold voltage that is one-half of the maximum $V_{OUT}$, $V_{THOUTMAX}$, is used as a decision threshold voltage, $V_{THDEC}$, by a decision circuit 13 to decide whether a bit of the incoming binary data stream is a logic 1 or a logic 0. The decision circuit 13 compares the output voltage $V_{OUT}$ of the TIA circuit 5 with the decision threshold voltage $V_{THDEC}$ to make the bit decision. The decision circuit 13 may be a simple comparator circuit, with or without hysteresis.

For larger levels of the optical input signal 2, when $V_{OUT}$ reaches an AGC threshold voltage, $V_{THAGC}$, a controller circuit 14 of the AGC circuit 4 that compares $V_{OUT}$ to $V_{THAGC}$ delivers an output signal to a peak-hold circuit 15 of the AGC circuit 4 that causes it to output an AGC output voltage, $V_{AGC}$. The AGC threshold voltage $V_{THAGC}$ is generated by a voltage source 17 of the AGC circuit 4. In the case of larger increasing optical input signals 2, the output voltage $V_{AGC}$ causes the resistance value of the variable resistor 6 to decrease, which decreases the transimpedance value of the TIA circuit 5. The decrease in the transimpedance value causes $V_{OUT}$ to decrease until it reaches $V_{THAGC}$. Therefore, after stabilization, $V_{OUT}=V_{THAGC}$ corresponds to a logic 1 bit and $V_{OUT}=0$ corresponds to a logic 0 bit. Because the linear peak detector 9 outputs a much higher threshold voltage during the stabilization phase, the maximum threshold voltage output from the linear peak limiter 11, $V_{THMAX}$, is limited to $V_{THAGC}/2$ in order to provide a precise decision between a High bit (logic 1) and a Low bit (logic 0). The AGC control loop timing constant is set to match the bit duration in order to achieve a correct bit decision for the first and subsequent bits of the incoming data stream.

In order to properly discharge the linear peak detector 9 and the AGC peak-hold circuit 15, an activity detector 16 of the AGC circuit 4 detects whether or not the AGC circuit 4 is active based on the output of the AGC peak-hold circuit 15. In the case of small optical input signals 2 (i.e., when the AGC circuit 4 is inactive), the linear peak detector 9 should be slowly discharged. In the case of large optical input signals 2 (i.e., when the AGC circuit 4 is active), the linear peak detector 9 should be kept charged under all circumstances in order to ensure that the maximum threshold voltage $V_{THMAX}$ is used by the decision circuit 13. The peak-hold circuit 15 of the AGC circuit 4 is slowly discharged over time when no input signal 2 is present. If the AGC circuit 4 falls below its activation level based on the comparison performed by the controller circuit 14, then the linear peak detector 9 starts to be discharged until the minimum threshold limit $V_{THMIN}$ is reached. At that point in time, the Rx 1 is operating in its normal burst-mode condition for no optical signal 2 being detected by the photodiode 3 and waits for new incoming optical signals 2 to be detected.

A function generator 18 generates a correction signal that is based on the $V_{THLIM}$ signal output by the linear peak limiter 11 and based on the output voltage $V_{AGC}$ output by the AGC circuit 4. The correction signal steers a timing adjustment circuit 20. A High (logic 1) output signal output from the decision circuit 13 is always longer than the corresponding bit in the input optical signal 2 due to the adaptive threshold process performed by components 9 and 11, which can result in pulse-width distortion. In order to prevent pulse-width distortion from occurring, or to reduce the amount of distortion that occurs, the timing adjustment circuit 20 "shrinks" the corresponding pulse duration by either accelerating the falling edge of the pulse, or, alternatively, by phase shifting the entire signal, which has the effect of pulse shrinking. In this way, the incorporation of the function generator 18 and the timing adjustment circuit 20 into the Rx 1 reduces the occurrence of systematic pulse enlargement that might otherwise occur if the decision circuit 13 outputs a wrong decision based on the rising edge of $V_{OUT}$.

Because the timing correction factor that is applied by the function generator 18 depends in a nontrivial way on various parameters of the Rx 1, 100 (i.e., photodiode bandwidth, TIA bandwidth, AGC bandwidth enhancement, and therefore dependence on pulse amplitude, transmitter pulse shape), the optimization of the function generator 18 is preferably performed as a last step after the Rx signal chain has already been modeled and optimized (and available as an exact representation in the simulation environment). Optimization is then performed by adjusting, in an iterative way, various parameters of the function generator 18, which steers the timing adjustment circuit 20 to achieve minimum pulse-width distortion over the full input range of optical signals.

FIG. 2 is a schematic diagram of the burst-mode optical Rx 100 in accordance with a second illustrative embodiment in which a differential configuration of Topology A is employed. As in the embodiment described above with reference to FIG. 1, the resistance value of the variable resistor 6 is steered by the AGC circuit 4, but with a differential configuration as will be described below in detail. Here again, as in the embodiment represented by FIG. 1, an input optical signal 2 is fed to a photodiode 3, which converts the input optical signal 2 into a corresponding electrical current signal. The photodiode 3, and for symmetry reasons, a light-shielded photodiode 3a, are connected to a full differential TIA circuit 101 that converts the electrical current signals output from the photodiodes 3 and 3a into a differential voltage signal $V_{OUT}$. The TIA circuit 101 comprises a differential amplifier 102, fixed resistors 8 and 8a, and voltage-controllable or current-controllable variable resistors 6 and 6a.

For small optical input signals 2, the AGC circuit 4 is in an inactive state and a linear peak detector 109 is in an active state. In the active state, the linear peak detector 109 generates, through the linear peak limiter 111, an optimum decision threshold voltage $V_{THDEC}$ for the decision circuit 113 that is half of the $V_{OUT}$ signal level for a High bit. The linear peak detector 109 and the linear peak limiter 111 comprise a threshold generation circuit 110. For large optical input signals 2 (i.e., $V_{OUT}$ greater than $V_{THAGC}$), the controller circuit 14 begins adjusting the resistance values of the variable resistors 6 and 6a via the AGC peak-hold circuit 15 to cause the voltage level of the High-bit $V_{OUT}$ signal levels to be kept at $V_{AGCTB}$. Therefore, the High-bit $V_{OUT}$ signal levels are kept at constant levels and the decision threshold level $V_{THDEC}$ is limited by the linear peak limiter 111 to $V_{AGCTH}/2$ for optimum bit decision making. The AGC threshold voltage $V_{AGC}$ is set by a fixed level shifter 112 that sets $V_{AGC}$ based on the voltage signal that is output from the positive terminal of the differential amplifier 102. The decision threshold voltage, $V_{THDEC}$, of the decision circuit 113 is set by a variable level shifter 114 based on the voltage signal that is output from the positive terminal of the differential amplifier 102.

The AGC activity detector 16 determines whether or not the AGC circuit 4 is active based on $V_{AGC}$ and manages the discharging of the AGC peak-hold circuit 15 and the linear peak detector 109. In the absence of an optical input signal 2, the AGC circuit 4 is active and the AGC peak-hold circuit 15 is discharged while the linear peak detector 109 is kept charged. If the AGC peak-hold circuit 15 falls below $V_{AGCTH}$, then the AGC activity detector 16 begins discharge the linear peak detector 109. The linear peak limiter 111 may have a lower limit that is greater than 0 Volts (V) to prevent sporadic toggling of the data output signal 12 when there is no optical input signal 2. As in the embodiment of FIG. 1, the function generator 18 generates a correction signal that steers the timing adjustment circuit 20 to prevent or reduce pulse-width distortion.

FIG. 3 illustrates an embodiment of a single-ended configuration of the burst-mode optical Rx 200 based on Topology B. In accordance with this illustrative embodiment, the TIA circuit 210 has a nonlinear resistor 211 that is used to compress the large dynamic range of the electrical current signal produced by the photodiode 3. The nonlinear resistor 211 has a nonlinear transimpedance that acts as an instantaneous AGC circuit, which obviates the need for the AGC circuit 4 shown in FIGS. 1 and 2. Eliminating the AGC circuit 4 provides the optical Rx 200 with certain speed advantages over the optical Rx 1 and the optical Rx 100 of the embodiments of FIGS. 1 and 2, respectively, due to the extremely fast reaction time of the nonlinear resistor 211. When designing and implementing the Rx 200, care should be taken to match the functions performed by a threshold generation circuit 220, a discharge current generation circuit 230, and a timing correction generator 260 in order to ensure proper post processing of the output voltage $V_{OUT}$ of the TIA circuit 210 by a timing adjustment circuit 270.

The optical input signal 2 that is incident on the photodiode 3 is converted by the photodiode 3 into a corresponding electrical current signal. For small electrical current signals, the nonlinear resistor 211 is in a high impedance state and the TIA circuit 210 operates in a linear mode with a linear transimpedance value. A linear peak detector 240 and the threshold generation circuit 220 together comprise a threshold generator that generates, in a linear manner, a threshold voltage $V_{THDEC}$ to be used by a bit decision circuit 250 for making the bit decisions. The linear peak detector 240 outputs the peak detected voltage, $V_{PK}$, that it detects, which is then halved by the threshold generation circuit 220 to produce $V_{THDEC}$.

For larger input current signals (i.e., larger optical input power levels), the nonlinear resistor 211 lowers its impedance and thereby keeps the TIA circuit 210 below saturation. For example, the nonlinear resistor 211 should have logarithmic behavior to simplify the threshold generation process performed by components 220 and 240. In the logarithmic case, the decision threshold voltage $V_{THDEC}$ is generated by the threshold generation circuit 220 by subtracting a constant voltage based on the constants of the logarithmic TIA conversion process from the output voltage of the linear peak detector 240. The constants of the logarithmic conversion process should be matched to the linear range of the linear peak detector 240 to achieve a seamless threshold generation operation that avoids having to take steps to avoid functional gaps.

The discharge current generation circuit 230 ensures that the linear peak detector 240 is correctly discharged for the different ranges (i.e., linear vs. logarithmic). In the linear range, the discharge current generation circuit 230 discharges the linear peak detector 240 exponentially. In the logarithmic range, the discharge current generation circuit 230 discharges the linear peak detector 240 linearly with time. The threshold generation circuit 220 may also have a lower limit of the threshold output voltage to ensure quietness of the digital output 12 in the case of no optical input power. The decision circuit 250 may be a comparator circuit, or alternatively, a Schmitt-trigger circuit to avoid chatter during slow transients. The timing correction generator 260 generates a timing correction signal that steers a timing adjustment circuit 270 to correct, dependent upon the input level, the pulse-width of the voltage signal output from the decision circuit 250 for timing error minimization.

Because the timing correction factor that is applied by the timing correction generator 260 depends in a nontrivial way on various parameters of the Rx 200 (i.e., photodiode bandwidth, TIA bandwidth, AGC bandwidth enhancement, and therefore dependence on pulse amplitude, transmitter pulse shape), the optimization of the timing correction generator 260 is preferably performed as a last step after the Rx signal chain has already been modeled and optimized (and available as an exact representation in the simulation environment). Optimization is then performed by adjusting, in an iterative way, various parameters of the timing correction generator 260, which steers the timing adjustment circuit 270 to achieve minimum pulse-width distortion over the full input range of optical signals.

FIG. 4 illustrates another embodiment of the burst-mode optical Rx 300 having a differential configuration and being based on Topology B. In accordance with this embodiment, the signal chain is fully differential and the function is very similar to the single-ended Rx 200 shown in FIG. 3. The main difference between the embodiments of FIGS. 3 and 4 is that the nonlinear differential TIA circuit 310 of FIG. 4 includes an additional correction current generation circuit 320 for the nonlinear mode of operations that injects current in the path in which the shielded photodiode 3a resides. Also, a variable level shifter 330 is used to generate the $V_{THDEC}$ to be used by decision circuit 250 based on the differential signal $V_{OUT}$.

The correction current generation circuit 320 prevents current charge/discharge effects in the shielded photodiode 3a. The circuit 320 is only active in the nonlinear region. In the linear region, this circuit 320 is inactive. The circuit 320 includes an amplifier 321 and a current source 322. In order to provide seamless activation of circuit 320, it has a nonlinear characteristic that is matched to the nonlinearity of the differential TIA 102. The nonlinear resistors 211 and 211a are used to compress the large dynamic range of electrical current produced by the photodiodes 3 and 3a, respectively. The nonlinear resistors 211 and 211a have nonlinear transimpedances that behave as an instantaneous AGC circuit, as described above with reference to nonlinear resistor 211 of FIG. 3. The functions of the components 220-270 is as described above with reference to FIG. 3.

It should be noted that although the illustrative embodiments have been described with reference to an optical Rx, the principles and concepts of the invention may also be applied to an electrical Rx. In such cases, the photodiode is replaced by some other type of detector (not shown) that converts some other type of input signal into an electrical detection signal. Persons of skill in the art will understand how the principles and concepts of the invention can be applied in such non-optical environments.

It should be noted that the invention has been described with respect to illustrative embodiments for the purpose of describing the principles and concepts of the invention. The invention is not limited to these embodiments. The circuits described with reference to FIGS. 1-4 are merely examples of suitable configurations that demonstrate the principles and concepts of the invention. For example, many of the components that are used in the Rxs described above may be replaced by different components that perform the same or similar functions, as will be understood by persons of skill in the art. For example, although the components 3 and 3a have been described as being photodiodes, any suitable detector may be used for this purpose. Also, some of the components that are shown as being separate components may be combined into a single component that performs all of the functions associated with the separately-depicted components. For example, the functions of the linear peak detector 9 and the linear peak limiter 11 may be performed by a single linear peak detector 9 that has a built-in limiting structure or an inherent limiting function. As will be understood by those skilled in the art in view of the description being provided herein, many modifications may be made to the embodiments described herein without deviating from the goals of the invention, and all such modifications are within the scope of the invention.

What is claimed is:

1. A burst-mode receiver (Rx) comprising:
   a detector configured to receive an input signal and to output an electrical detection signal;
   a transimpedance amplifier (TIA) circuit receiving the electrical detection signal output by the detector, the TIA circuit comprising at least a first variable resistor having a resistance value that can be varied to cause a gain of the TIA circuit to be varied, the TIA circuit outputting an output voltage signal, $V_{OUT}$, having a value that is based, at least in part, on the gain of the TIA circuit;
   an automatic gain control (AGC) circuit receiving $V_{OUT}$, the AGC circuit having a controller circuit that causes an AGC output voltage signal, $V_{AGC}$, having a value that is set based at least in part on $V_{OUT}$ to be output from the AGC circuit to the TIA circuit, and wherein the resistance value of the variable resistor is varied based on the value of $V_{AGC}$;
   a threshold generation circuit that receives $V_{OUT}$ and produces a bit decision threshold value, $V_{THDEC}$, based on $V_{OUT}$, wherein $V_{THDEC}$ is output from the threshold generation circuit, and wherein the threshold generation circuit varies $V_{THDEC}$ based on variations of $V_{OUT}$;
   a bit decision circuit receiving $V_{OUT}$ from the TIA circuit and receiving $V_{THDEC}$ from the threshold generation circuit, wherein the bit decision circuit compares $V_{OUT}$ to $V_{THDEC}$ and produces a bit decision signal that is based on the comparison of $V_{OUT}$ to $V_{THDEC}$; the bit decision signal being output from the bit decision circuit; and
   a timing adjustment circuit receiving the bit decision signal from the bit decision circuit, the timing adjustment circuit shrinking the pulse duration of the bit decision signal to reduce or eliminate pulse-width distortion in the bit decision signal and outputting a data output signal.

2. The burst-mode optical Rx of claim 1, wherein the TIA circuit comprises:
   an amplifier having at least first and second input terminals and at least a first output terminal, the first input terminal of the amplifier being connected to an output terminal of the detector for receiving the electrical detection signal from the detector, wherein the first variable resistor has a first terminal that is electrically coupled to the first input terminal of the amplifier and having a second terminal that is electrically coupled to the first output terminal of the amplifier; and
   at least a first fixed resistor having a fixed resistance value, the first fixed resistor having a first terminal that is electrically coupled to the first input terminal of the amplifier and having a second terminal that is electrically coupled to the first output terminal of the amplifier, wherein the gain of the TIA circuit is based on the resistance values of the first variable resistor and the first fixed resistor.

3. The burst-mode Rx of claim 2, wherein the AGC circuit further comprises:
   an AGC peak-hold circuit having a first input terminal that is electrically coupled to an output terminal of the controller circuit for receiving an output signal from the controller circuit, the AGC peak-hold circuit generating $V_{AGC}$ based on the output signal received from the controller circuit, the AGC peak-hold circuit having an output terminal that is electrically coupled to the first terminal of the first variable resistor of the TIA circuit.

4. The burst-mode Rx of claim 3, wherein the AGC circuit further comprises:
   an AGC activity detector having an input terminal that is electrically coupled to the output terminal of the AGC circuit for receiving $V_{AGC}$, the AGC activity director determining whether the AGC peak-hold circuit should be discharged based on $V_{AGC}$, wherein if the AGC activity detector determines that the AGC peak-hold circuit should be discharged, the AGC activity detector outputs a first discharge signal to the AGC peak-hold circuit that causes the AGC peak-hold circuit to be discharged.

5. The burst-mode Rx of claim 4, wherein the threshold generation circuit comprises:
   a linear peak detector that receives $V_{OUT}$ and outputs a threshold voltage, $V_{TH}$, based on $V_{OUT}$; and
   a linear peak limiter that receives $V_{TH}$ and limits $V_{TH}$ to a limited threshold voltage, $V_{THLIM}$, and wherein $V_{THDEC}$ used by the bit decision circuit is $V_{THLIM}$.

6. The burst-mode Rx of claim 5, wherein the linear peak limiter is an integral part or an inherent structure of the linear peak detector.

7. The burst-mode Rx of claim 5, wherein the AGC activity detector determines whether the linear peak detector should be discharged based on $V_{AGC}$, wherein if the AGC activity detector determines that the linear peak detector should be discharged, the AGC activity detector outputs a second discharge signal to the linear peak detector that causes the linear peak detector to be discharged.

8. The burst-mode Rx of claim 5, wherein the AGC activity detector determines whether the linear peak detector should be discharged based on $V_{AGC}$, wherein if the AGC activity detector determines that the linear peak detector should be discharged, the AGC activity detector outputs a second discharge signal to the linear peak detector that causes the linear peak detector to be discharged.

9. The burst-mode Rx of claim 5, further comprising:
a function generator that receives $V_{THLIM}$ and $V_{AGC}$ and generates a correction signal that steers the timing adjustment circuit.

10. A method for use in a burst-mode receiver (Rx), the method comprising:
with a detector, receiving an input signal and outputting an electrical detection signal;
with a transimpedance amplifier (TIA) circuit, receiving the electrical detection signal outputted by the detector, the TIA circuit having a variable gain;
outputting an output voltage signal, $V_{OUT}$, from the TIA circuit, wherein $V_{OUT}$ has a value that is based at least in part on the gain of the TIA circuit;
with an automatic gain control (AGC) circuit, producing an AGC output voltage signal, $V_{AGC}$, having a value that is set based at least in part on $V_{OUT}$;
outputting $V_{AGC}$ from the AGC circuit to the TIA circuit;
in the TIA circuit, varying a resistance value of a variable resistor of the TIA circuit based on the value of $V_{AGC}$ to cause the gain of the TIA circuit to vary;
in a threshold generation circuit, producing a bit decision threshold value, $V_{THDEC}$, based on $V_{OUT}$, and wherein the threshold generation circuit varies $V_{THDEC}$ based on variations of $V_{OUT}$;
in a bit decision circuit, comparing $V_{OUT}$ to $V_{THDEC}$ and producing a bit decision signal that is based on the comparison; and
with a timing adjustment circuit, shrinking a pulse width of the bit decision signal to reduce or eliminate pulse-width distortion in the bit decision signal and outputting a data output signal.

11. The method of claim 10, wherein the Rx is an optical Rx and wherein the detector is an optical detector that detects an optical signal and outputs the electrical detection signal.

\* \* \* \* \*